(12) United States Patent
Dell'Amico et al.

(10) Patent No.: US 11,387,924 B2
(45) Date of Patent: Jul. 12, 2022

(54) METHOD OF NOISE ESTIMATION, CORRESPONDING DEVICE AND COMPUTER PROGRAM PRODUCT

(71) Applicant: STMicroelectronics S.r.l., Agrate Brianza (IT)

(72) Inventors: Gabriele Dell'Amico, Saint-Pierre (IT); Eleonora Guerrini, Aosta (IT); Athos Marcon, Lecco (IT); Francesco Balducci, Novara (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 167 days.

(21) Appl. No.: 16/858,255

(22) Filed: Apr. 24, 2020

(65) Prior Publication Data

US 2020/0358541 A1 Nov. 12, 2020

(30) Foreign Application Priority Data

May 10, 2019 (IT) .......................... 102019000006711

(51) Int. Cl.
*H04B 17/336* (2015.01)
*H04B 17/354* (2015.01)
*H04B 17/391* (2015.01)

(52) U.S. Cl.
CPC ......... *H04B 17/336* (2015.01); *H04B 17/354* (2015.01); *H04B 17/391* (2015.01)

(58) Field of Classification Search
CPC ... H04B 17/336; H04B 17/354; H04B 17/391
See application file for complete search history.

(56) References Cited

U.S. PATENT DOCUMENTS

| 9,413,423 | B1 | 8/2016 | Pande et al. | |
|---|---|---|---|---|
| 2004/0057502 | A1 | 3/2004 | Azenkot et al. | |
| 2013/0051482 | A1* | 2/2013 | Nassar | H04B 3/542 375/257 |
| 2014/0091629 | A1* | 4/2014 | Ishibashi | H02J 9/062 307/66 |
| 2018/0301157 | A1* | 10/2018 | Gunawan | G10L 21/0208 |

FOREIGN PATENT DOCUMENTS

| CN | 1703840 A | 11/2005 |
|---|---|---|
| CN | 103647610 A | 3/2014 |
| CN | 106470080 A | 3/2017 |

\* cited by examiner

*Primary Examiner* — Natasha W Cosme
(74) *Attorney, Agent, or Firm* — Slater Matsil, LLP

(57) ABSTRACT

Noise in a communication channel is estimated by, in the absence of transmitted information packets, obtaining a plurality of sets of signal samples, and estimating noise power levels associated with the sets of signal samples and allotted to respective noise power classes. In the presence of at least one transmitted information packet, an information packet power level is estimated. A set of signal-to-noise ratios computed between the information packet power level and the noise power levels in the respective noise power classes are compared against a signal-to-noise threshold and partitioned into a first subset and a second subset of signal-to-noise ratios failing to exceed/exceeding, respectively, the threshold. One or more resulting impulsive noise parameters are computed as a function of impulsive noise parameters indicative of noise power levels in the signal-to-noise ratios in the first subset while disregarding impulsive noise parameters indicative of noise power levels in the second subset.

17 Claims, 2 Drawing Sheets

METHOD OF NOISE ESTIMATION, CORRESPONDING DEVICE AND COMPUTER PROGRAM PRODUCT

CROSS-REFERENCE TO RELATED APPLICATIONS

This application claims the benefit of Italian Application No. IT 102019000006711, filed on May 10, 2019, which application is hereby incorporated herein by reference.

TECHNICAL FIELD

The description relates to noise estimation in communication systems.

One or more embodiments may be applied, for instance, in power line communication (PLC) systems for use in metering applications in "smart" electrical distribution grids.

BACKGROUND

Various communication systems adopt adaptive transmission schemes. An adaptive transmission scheme may involve (automatically) configuring a transmitter with a certain modulation and coding scheme (MCS) in order to facilitate a satisfactory balance of data rate, transmission power and error probability.

For instance, a certain MCS can be selected as a function of feedback information obtained from the receiver. For instance, the feedback information used for selecting a MCS may be a signal-to-noise ratio (SNR) estimated at the receiver taking into account the received power levels of signal and noise.

Typically, procedures for MCS selection are designed to apply to a communication channel characterized by stationary noise.

In certain applications such as PLC, for instance, non-stationary noise, such as impulsive noise, may be present which may significantly affect system performance. In such applications, the procedures for the selection of MCS developed for stationary noise may not operate in an entirely satisfactory manner.

SUMMARY

An object of one or more embodiments is to contribute in facilitating reliable estimation of noise (in terms of signal-to-noise ratio or SNR, for instance) in the presence of such impulsive noise.

According to one or more embodiments, that object may be achieved by means of a method having the features set forth in the claims that follow.

One or more embodiments may relate to a corresponding circuit.

One or more embodiments may relate to a corresponding computer program product, loadable in the memory of at least one computer and including software code portions for executing the steps of the method of one or more embodiments when the product is run on at least one computer.

As used herein, reference to such a computer program product is understood as being equivalent to reference to a computer-readable means containing instructions for controlling the processing system in order to co-ordinate the implementation of the method according to one or more embodiments.

The claims are an integral part of the disclosure provided herein in relation to the one or more embodiments.

One or more embodiments facilitate developing a SNR estimation approach that takes into account non-stationary noise (i.e., power, duration and occurrence of impulses) and re-maps it into a SNR equivalent to a SNR computed in presence of stationary noise.

One or more embodiments may offer one or more of the following advantages:
  accuracy of estimation is not related to factors such as the length of the packets used for transmission and/or the offset between the packets and the pulses/bursts;
  random pulses may be taken into account in estimation even if they do not lie in a received packet;
  noise having an amplitude comparable to the packet(s) used for transmission can be detected; this may turn out to be useful insofar as—especially in the case of pulses having long duration—these may appreciably affect receiver performance.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Estimation of noise (that is, evaluation or calculation of noise levels, for instance in terms of a signal-to-noise ratio, briefly, SNR) has been the subject matter of extensive investigation.

Documents such as U.S. Pat. No. 9,413,423 B1 are exemplary of related activity.

The solution disclosed in such a document includes receiving a packet of symbols over a channel having periodic impulsive noise and determining a number of bad symbols in the packet due to interference as well as a remaining plurality of good symbols in the packet. A signal-to-noise ratio (SNR) is computed based (only) on the good symbols in the packet and a signal-to-noise correction value is determined as a function of the ratio of the bad symbols and the good SNR value with an effective signal-to-noise ratio calculated by adjusting the good value as a function of the correction value.

Such an arrangement may suffer from various drawbacks.

For instance, the accuracy in estimating the bad symbol ratio may be affected by packet length and the offset between the impulses and the packet.

Also, detecting bad symbols in a packet may turn out to be far from easy when the impulses have a power level comparable to the signal level.

Figure 1:
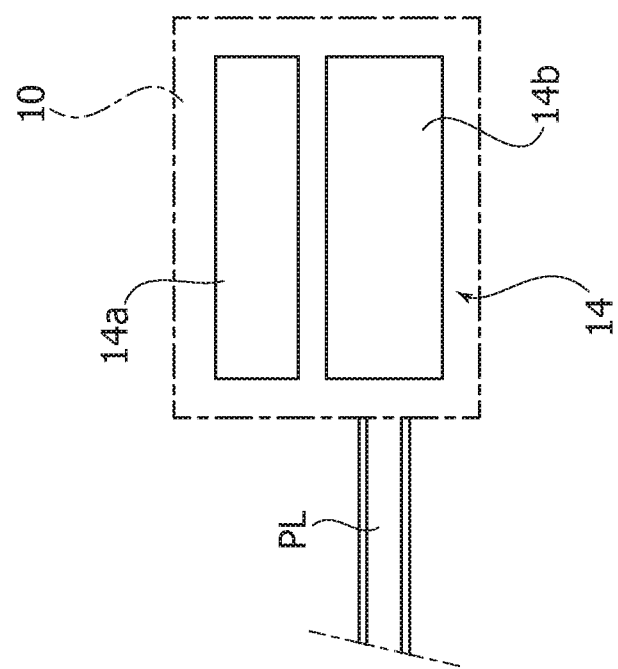
FIG. 1 is a functional block diagram exemplary of a possible context of use of embodiments.
Figure 1:
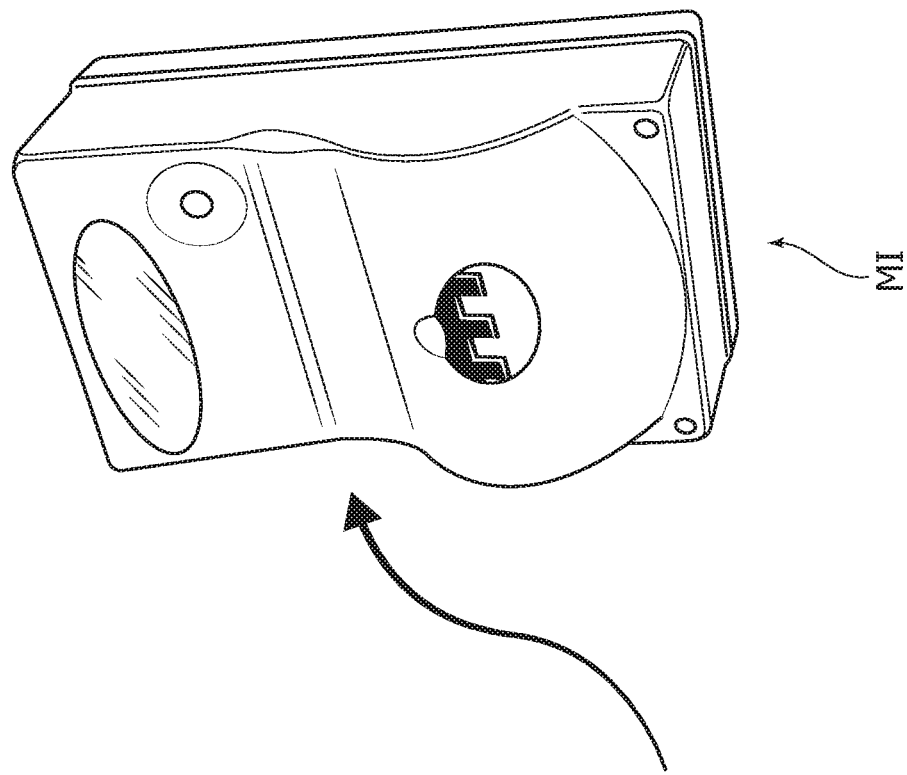

One or more embodiments address this and other issues in view of a possible application in a context as exemplified in FIG. 1, that is, a power line communication (PLC) system associated to a metering apparatus MI (an electricity meter, for instance) in a "smart" electrical distribution grid here exemplified as a power line PL.

Those of skill in the art will otherwise appreciate that possible applications of embodiments are not limited to such a PLC context. One or more embodiments may in fact be applied, in general, to estimating noise in communication channels likely to be affected by impulsive (burst-like) noise.

As exemplified in FIG. 1, the metering apparatus MI is coupled to the power line PL via a line interface 10 which may comprise a subsystem 14 including a random-access memory (RAM) 14a as well as processing core 14b (a MicroController Unit or MCU, for instance).

The subsystem 14 may be configured—in a manner known per se to those of skill in the art—to implement a procedure as discussed in the following in connection with the flowchart of FIG. 2.

Other than for what will be discussed in the following (in connection with FIG. 2, for instance) an arrangement as exemplified in FIG. 1 can be regarded as conventional in the art, which makes it unnecessary to provide a more detailed description herein.

One or more embodiments as exemplified herein may involve detecting the presence of an information packet over the line PL.

The presence of the information packet may be determined by means of packet detection procedures known to those of skill in the art: auto-correlation and cross-correlation procedures are exemplary of these.

In one or more embodiments, if an information packet is not present, noise can be (continuously) processed at the receiver until an information packet is detected and "classified" in different noise classes as a function of the power level thereof.

A power value and a value indicative of the rate of occurrence of the impulsive noise (for instance, in terms of impulses over a time unit) can be estimated for each class of noise.

In the presence of an information packet received, the power of the received packet can be estimated, again by resorting to methods known to those of skill in the art (data-aided and non-data-aided procedures may be exemplary of these), with a corresponding signal-to-noise ratio computed for each class of noise.

In the case of Orthogonal Frequency-Division Multiplexing or OFDM systems, for instance, power can be estimated (computed) in the time domain or in the frequency domain.

In one or more embodiments, a final rate of impulsive noise can be computed by considering (only) the noise included in those classes for which the signal-to-noise ratio computed is expected to have an impact on receiver performance, for instance due to the associated signal-to-noise ratio failing to exceed (for instance being lower than) a certain signal-to-noise threshold value.

A final signal-to-noise ratio can then be computed as a function of:
  a signal-to-noise ratio obtained by considering (only) the background, that is, stationary, component of noise (AWGN, for instance), and
  a final rate of impulsive noise computed as discussed previously.

The resulting final signal-to-noise ratio thus calculated (estimated) can be exploited, for instance, for adaptive transmission (selection of certain modulation and/or coding scheme) as otherwise conventional in the art.

An arrangement as exemplified herein can be used in connection with communication channels affected by additive white Gaussian noise (AWGN) occurring in pulses and/or by impulsive noise as possibly generated by power-over-Ethernet devices, for instance.

Figure 2:
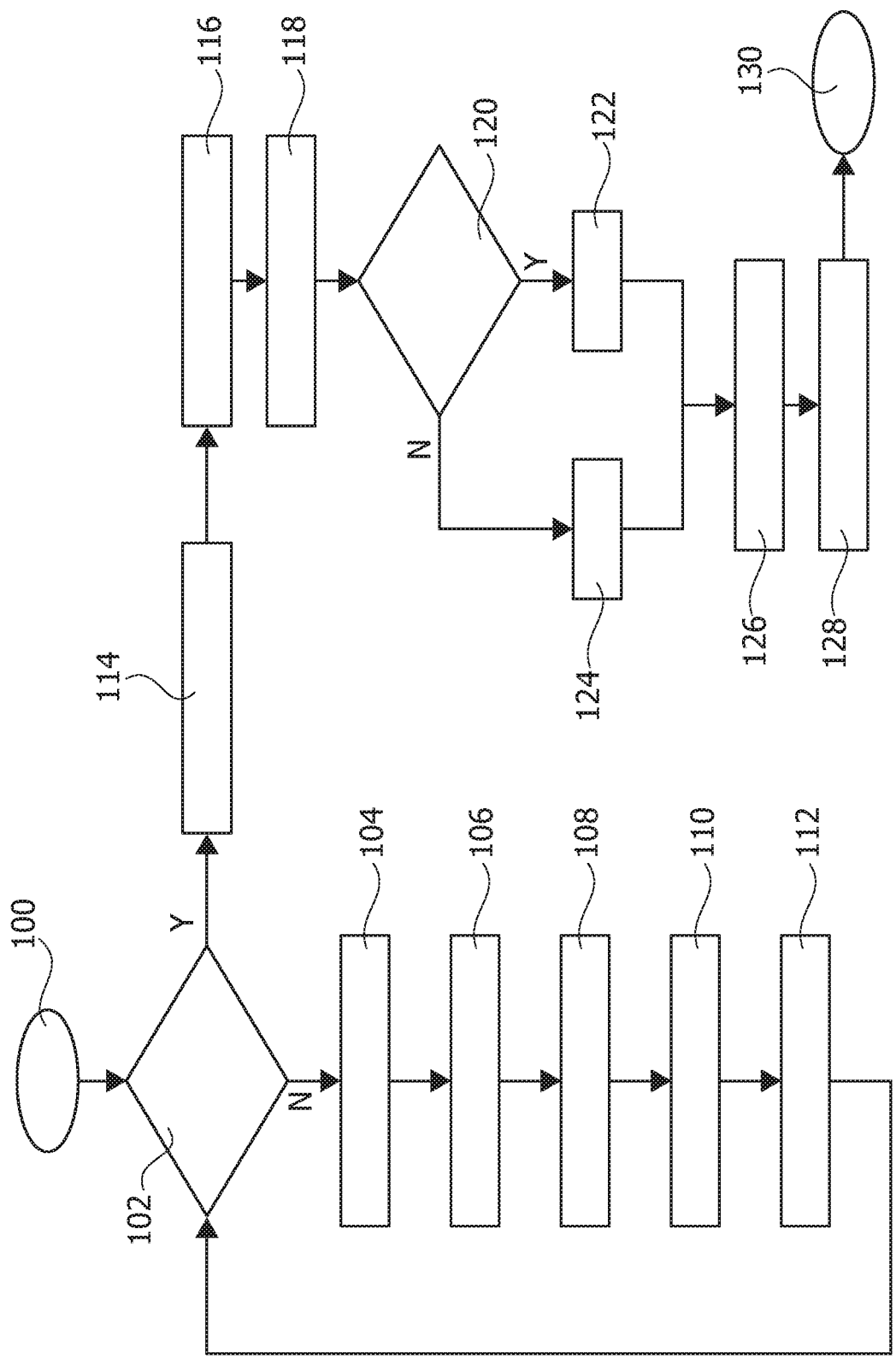
FIG. 2 is a flowchart exemplary of possible acts in embodiments.

The flowchart of FIG. 2 is exemplary of a possible sequence of acts which may be performed in a device such as 10, for instance thanks to a set of software code portions (computer program product) loaded in a memory in the interface 10, for instance in the memory 14a of the real time subsystem 14 and run, for instance on the processing core 14b provided therein.

After start (as exemplified at 100), in an act represented by block 102, a check is made (in a manner known per se to those of skill in the art) as to whether a "useful" signal—an information packet towards the metering apparatus MI, for instance—is present on the power line PL.

If no such information packet is detected to be present (negative outcome of block 102) N samples of signal (voltage and/or current) present on the power line PL are sampled in an act as represented by block 104 with N being an integer greater or equal to 1.

A value for N may be selected by taking into account various factors such as sampling rate, memory available, impulse duration, desired estimation reliability/accuracy, desired speed of estimation.

For instance, in OFDM systems, N may be chosen as the number of points in the associated fast Fourier transform (FIT).

In an act as represented by block 106, the power associated to the N samples is computed (again in a manner known per se to those of skill in the art) and in an act as represented by block 108 the power computed is associated to a certain class of noise designated $C_i$.

In one or more embodiments, each such class of noise $C_i$ can be associated to a certain range of power values $[\overline{P}_{i-1}, \overline{P}_i)$ with $\overline{P}_{i-1} < \overline{P}_i$ and $i=1, 2, \ldots, L$, where L is the number of classes of the impulsive noise, and $\overline{P}_0 = 0$ and $\overline{P}_L = \infty$.

For instance, the thresholds $\overline{P}_i$ can be determined experimentally taking into account the characteristics of the power line PL.

Block 110 in FIG. 2 is exemplary of an act of computing an occurrence rate $R_i$ associated to a certain class of noise $C_i$.

In one or more embodiments, a counter $n_i$ relative to the class of noise $C_i$ may be incremented every time a noise power is allotted to such class of noise $C_i$. The counter $n_i$ may be used, for instance, to compute an occurrence rate $R_i$ as $$R_i = \frac{n_i}{\sum_{i=1}^{L} n_i}$$

In an act as exemplified by block 112, an estimate of the noise power $P_i$ associated to the class of noise $C_i$ can be computed such that $\overline{P}_{i-1} \leq P_i < \overline{P}_i$. For instance, the estimated power $P_i$ may be computed as the average of all the power values returned by block 106 that have been associated to class of noise $C_i$ by block 108.

In that way, various classes $C_i$ of noise detected to be present (on the line PL, for instance) can be possibly arranged in an orderly fashion starting from a "least noisy" class (background noise only, for instance) with "more noisy" classes identified up to a "most noisy" class, with one or more classes possibly being in fact "empty" insofar as no noise power in the range [$\overline{P}_{i-1}$, $\overline{P}_i$) has been detected for a corresponding class $C_i$.

The block 114 in FIG. 12 is exemplary of an act where, as a result of a positive outcome of the act exemplified by block 102—that is, due to an information packet being detected to be present on the line PL—the power of such an information packet $P_s$ is estimated.

As noted, this may occur according to any method known to those of skill in the art for the purpose: for instance, in the case of OFDM systems, power can be estimated (computed) in the time domain or in the frequency domain.

Also, noise possibly superposed to a packet can be dealt with in estimating the useful signal power by resorting to solutions known to those of skill in the art (data-aided o non-data-aided procedures as discussed previously, for instance).

For simplicity of description, noise estimation is exemplified in FIG. 2 as taking place before reception of a (first) information packet: it will be otherwise appreciated that noise power lends itself to be estimated by monitoring the channel (line PL) between two subsequent information packets: if no sufficient noise is available to facilitate an estimation upon arrival of a first information packet, noise estimation can be postponed to a subsequent packet(s).

Whatever the circumstances, in an act exemplified by block 116, for each (non-empty) class of noise $C_i$ identified as discussed previously, a respective signal-to-noise ratio can be estimated as $$SNR_i = P_s/P_i \text{ with } i=1,2,\ldots,L$$

with the possibility to define, in an act as exemplified by block 118, a first signal-to-noise ratio $SNR_1$ as corresponding to a signal-to-noise ratio $SNR_{BKGN}$, that is as the ratio of the signal power $P_s$ estimated at 114 to the (noise) power corresponding to a noise background level $P_1$.

In an act as exemplified by block 120, the various signal-to-noise ratios $SNR_i$ with i>1 estimated in the act 116 are compared against a reference threshold $SNR_{THR}$.

In one or more embodiments, such a signal-to-noise threshold can be defined based on the following principle:
- the condition $SNR_i > SNR_{THR}$ can be assumed to represent a condition where the noise level can be reasonably regarded as having a negligible effect on system (receiver) performance: the associated noise and the occurrence rate $R_i$ of the corresponding class of noise can thus be disregarded in the computation of a final ratio R as discussed in the following;
- conversely, the condition $SNR_i \leq SNR_{THR}$ can be assumed to represent a condition where the corresponding impulsive noise can have a possible impact on system (receiver) performance: the associated noise (for instance, the occurrence rate $R_i$ of the corresponding class of noise) is taken into account for computing the final ratio R.

As exemplified in the flowchart of FIG. 2, such a general principle can be implemented as follows:
- a positive outcome of the act 120 (corresponding to a signal-to-noise ratio $SNR_i$ with i>1 to be considered for the purpose of computing the final ratio R) will result in an act 122 wherein the occurrence rate $R_i$ is associated to a (first) set $S_1$;
- a negative outcome of the act 120 (corresponding to a signal-to-noise ratio SNR with i>1 which can be disregarded for the purpose of computing the final ratio R) will result in an act 124 wherein the occurrence rate $R_i$ is associated to a (second) set $S_2$.

In an act as exemplified by block 126 a rate R (final impulsive rate) may be computed based on a relationship such as:

$$R = \Sigma_{R_i \in S_1} R_i.$$

Based thereon, a final estimate $SNR_{EST}$ can be provided for the signal-to-noise ratio associated with the power line PL. Such a final estimate can be used, for instance, in order to select a modulation and coding scheme—MCS to be used for transmission over the power line PL.

It will be appreciated that, in one or more embodiments, the signal-to-noise ratio $SNR_{BKGN}$, that is the ratio of the signal power $P_s$ estimated at 114 to the (noise) power corresponding to the noise background level $P_1$ (that is, $P_i$ with i=1), may not be considered for the purpose of computing final impulsive rate R.

As exemplified herein, the final estimate $SNR_{EST}$ may then be computed in an act as exemplified by block 128 as a function of both the ratio R and the background signal-to-noise ratio $SNR_{BKGN}$, that is $SNR_{EST} = f(R, SNR_{BKGN})$.

The procedure may then reach an end condition as represented by block 130.

The choice of the specific function $f$ may depend on the specific features and desired performance of the system.

In one or more embodiment, the function $f$ may take the form of a lookup table (computed experimentally, for instance) according to the following principles:
  i) the rows represent a set of possible values that the rate R may assume;
  ii) the columns represent all possible MCS;
  iii) given a target performance (for instance a packet error rate), each cell stores a lowest (minimum) value of the background SNR which facilitates achieving such target performance for a corresponding MCS in the presence of impulsive noise characterized by the corresponding rate R;
  iv) when the values R and $SNR_{BKGN}$ are estimated by the receiver as discussed previously, the row corresponding to the rate R is read and the $SNR_{EST}$ is selected as the higher value lower than $SNR_{BKGN}$.

More sophisticated functions can be defined, possibly in conjunction with the procedure adopted for selecting certain MCS as a function of $SNR_{EST}$.

One or more embodiments may facilitate estimating the signal-to-noise ratio (SNR) in a packet transmission system working on a communication channel (such as a power line PL) affected by impulsive noise by analyzing the incoming signal and checking the presence of an information packet.

The following is an exemplary (non-limiting) recap of acts which may be implemented in a method as discussed previously:
- as long as no information packet is detected—that is, as long as only the noise signal is present on the channel (line PL)—a number of (consecutive) sets of N samples of the incoming signal may be collected and the power of each set of N samples of the (noise) signal is computed;

the power computed is allotted to a specific class of noise $C_i$ characterized by power values within a given range;

a rate $R_i$ is computed relative to the class of noise $C_i$, where $R_i$ accounts for the number of times the noise power is allotted to the class of noise $C_i$ with respect to a unit of time;

an estimated power $P_i$ relative to the class of noise $C_i$ is computed as a function of all the powers allotted to the class of noise $C_i$, where the lowest non-null value among all $P_i$ is $P_{BKGN}$ that represents the estimate of the power of the background noise;

as a result of an information packet being detected on the channel (line PL) the power of the information packet is computed and a value $SNR_i$ is computed for each class of noise $C_i$ as the ratio between the power of the information packet and the estimated power $P_i$ for that class;

the values $SNR_i$ are compared with a threshold $SNR_{THR}$ by defining two sets of classes of noise: a first set $S_1$ containing the classes of noise $C_i$ for which the value $SNR_i$ is lower than (or equal to) $SNR_{THR}$ and a second set $S_2$ containing the classes of noise $C_i$ for which the value $SNR_i$ is greater than $SNR_{THR}$;

a final rate of impulsive noise R is then computed combining the $R_i$ values associated to the set $S_1$;

a value $SNR_{EST}$ is computed as a final SNR taking into account the presence of the impulsive noise, as a function of the final rate of impulsive noise R and the value $SNR_{BKGN}$, which is the SNR computed as the ratio between the power of the information packet and the estimated power $P_{BKGN}$;

the value $SNR_{EST}$ is the feedback information sent from a receiver to a transmitter and used by the transmitter in order to select a modulation and coding scheme (MCS) to facilitate a target system performance, that is a desired balance between the data rate, the transmission power and error probability;

the power of the N samples of the noise signal may be computed in the time or frequency domain;

the ranges of the powers of the classes of noise $C_i$ may be set to fixed values predetermined based on communication channel knowledge or computed using a clustering algorithm run during a training phase;

the function of all the powers allotted to the class of noise $C_i$ used to estimate the power $P_i$ relative to the class of noise $C_i$ may be computed as a weighted average;

the power of the information packet may be computed in the time or frequency domain;

the rate $R_i$ relative to the class of noise $C_i$ may be computed by:

i) incrementing a counter $n_i$ relative to the class of noise $C_i$, where $n_i$ counts the number of time the noise power is allotted to the class of noise $C_i$;

ii) dividing $n_i$ by the sum of the counters relative to all classes of noise $C_i$;

the value of the threshold $SNR_{THR}$ represents a SNR value where the noise level can be considered as having a negligible effect on system performance;

the threshold $SNR_{THR}$ may be determined by means of performance curves in terms of packet-error-rate (PER) or bit-error-rate (BER) versus the $SNR_i$ where said performance curves can be theoretically or experimentally obtained;

for instance, R may be computed as the sum of the $R_i$ associated to the set $S_1$.

As noted, the preceding list of acts is provided with the sole purpose of facilitating understanding the instant detailed description of exemplary embodiments. Such a list is not to be construed, even indirectly, as implying that any such act requires to be implemented as described herein by way of example: this applies primarily, but not exclusively, to the mathematical relationships reported in the foregoing.

As exemplified herein, a method of estimating impulsive noise affecting transmission of information packets over a communication channel (for instance, PL) may comprise:

checking (for instance, 102) said communication channel for the presence of information packets; and i) as a result of said checking indicating the absence of information packets transmitted over said channel, obtaining a plurality of sets of signal samples sampled over said channel in the absence of information packets, estimating (for instance, 106) noise power levels associated with said sets of signal samples with the noise power levels computed allotted (for instance, 108) to respective noise power classes (for instance, C), ii) as a result of said checking (102) indicating the presence of at least one information packet transmitted over said channel, estimating (for instance, 114) an information packet power level (for instance, P) associated with said information packet.

Based on said information packet power level and said noise power levels in said respective noise power classes, a method as exemplified herein may comprise:

computing (for instance, 116) a set of signal-to-noise ratios (for instance, $SNR_i=P_s/P_i$ with i=1, 2, ..., L) of said information packet power level to the noise power levels in said respective noise power classes, comparing (for instance, 120) the signal-to-noise ratios in said set of signal-to-noise ratios against a signal-to-noise threshold (for instance, $SNR_{THR}$), wherein the signal-to-noise ratios in said set of signal-to-noise ratios are partitioned into a first subset (for instance, 122) of signal-to-noise ratios failing to exceed said signal-to-noise threshold (for instance, $SNR_i \leq SNR_{THR}$) and a second subset (for instance, 124) of signal-to-noise ratios exceeding said signal-to-noise threshold (for instance, $SNR_i > SNR_{THR}$), and computing (for instance, 126, 128) at least one resulting impulsive noise parameter (for instance, R, or $SNR_{EST}=f(R,SNR_{BKGN})$) as a function of impulsive noise parameters indicative of noise power levels included in the signal-to-noise ratios in said first subset of signal-to-noise ratios while disregarding impulsive noise parameters indicative of noise power levels included in the signal-to-noise ratios in said second subset of signal-to-noise ratios.

In a method as exemplified herein, said at least one resulting impulsive noise parameter may comprise a final impulsive noise rate (for instance, R) computed as a function of respective occurrence rates (for instance, $R_i$) indicative of the number of times over a unit of time a noise power is allotted to a respective noise power class in said respective noise power classes.

A method as exemplified herein may comprise computing (for instance, 110) said respective occurrence rates as a function of a counter (for instance, $n_i$) relative to a certain noise power class in said respective noise power classes, said counter being incremented every time a noise power is allotted to said certain noise power class (for instance, 108).

A method as exemplified herein may comprise selecting (for instance, 118), out of said noise power levels, a lowest non-null power level indicative of background noise affecting said communication channel, and either one or both of:

disregarding the signal-to-noise ratio (for instance $SNR_{BKGN}$) computed for said lowest non-null power level (for instance, $P_{BKGN}$) indicative of background noise in computing said final impulsive rate (R), and/or computing a global signal-to-noise ratio (for instance, $SNR_{EST}=f(R,SNR_{BKGN})$) for said communication channel as a function of both said final impulsive noise rate (for instance, R) and the signal-to-noise ratio (for instance, $SNR_{BKGN}$) for said lowest non-null power level indicative of background noise.

A communication interface (for instance, 10) as exemplified herein may be configured to be coupled to a communication channel affected by impulsive noise and comprise signal processing circuitry (for instance, 14b) configured to perform said:

checking said communication channel for the presence of information packets;

said computing a set of signal-to-noise ratios, said comparing the signal-to-noise ratios in said set of signal-to-noise ratios against a signal-to-noise threshold, and said computing at least one resulting impulsive noise parameter with a method as exemplified herein.

A communication interface as exemplified herein may be coupled to a power line communication channel in a power distribution grid.

A computer program product as exemplified herein may be loadable in the memory (for instance, 14a) of at least one computer (14b) and include software code portions for executing the steps of the method as exemplified herein when the product is run on at least one computer (for instance, 14b).

Without prejudice to the underlying principles, the embodiments may vary, even significantly, with respect to what has been discussed in the foregoing merely by way of example, without departing from the scope of protection.

The extent of protection is defined by the annexed claims.

What is claimed is:

1. A method of estimating impulsive noise affecting transmission of information packets over a communication channel, the method comprising:

checking the communication channel for a presence of the information packets, and
  i) in response to an absence of the information packets transmitted over the channel, obtaining a plurality of sets of signal samples sampled over the channel in the absence of the information packets, estimating noise power levels associated with the sets of signal samples, and allotting the estimated noise power levels to respective noise power classes, each power class representing a respective designated power level range of the communication channel during the absence of the information packets, and
  ii) in response to a presence of at least one information packet transmitted over the channel, estimating an information packet power level associated with the at least one information packet;

computing a set of signal-to-noise ratios of the information packet power level to the noise power levels in the respective noise power classes;

comparing the signal-to-noise ratios in the set of signal-to-noise ratios against a signal-to-noise threshold, the signal-to-noise ratios in the set of signal-to-noise ratios being partitioned into a first subset of signal-to-noise ratios failing to exceed the signal-to-noise threshold and a second subset of signal-to-noise ratios exceeding the signal-to-noise threshold; and computing at least one resulting impulsive noise parameter as a function of impulsive noise parameters indicative of noise power levels included in the signal-to-noise ratios in the first subset of signal-to-noise ratios while disregarding impulsive noise parameters indicative of noise power levels included in the signal-to-noise ratios in the second subset of signal-to-noise ratios.

2. The method of claim 1, wherein the at least one resulting impulsive noise parameter comprises a final impulsive noise rate computed as a function of respective occurrence rates indicative of a number of times over a unit of time a noise power is allotted to a respective noise power class in the respective noise power classes.

3. The method of claim 2, comprising computing the respective occurrence rates as a function of a counter relative to a certain noise power class in the respective noise power classes, the counter being incremented every time a noise power is allotted to the certain noise power class.

4. The method of claim 2, comprising:

selecting, out of the noise power levels, a lowest non-null power level indicative of background noise affecting the communication channel; and disregarding the signal-to-noise ratio computed for the lowest non-null power level indicative of background noise in computing the final impulsive noise rate.

5. The method of claim 2, comprising:

selecting, out of the noise power levels, a lowest non-null power level indicative of background noise affecting the communication channel; and computing a global signal-to-noise ratio for the communication channel as a function of both the final impulsive noise rate and the signal-to-noise ratio computed for the lowest non-null power level indicative of background noise.

6. A communication interface configured to be coupled to a communication channel affected by impulsive noise, the communication interface comprising signal processing circuitry configured to cause the communication interface to:

check the communication channel for a presence of information packets, and
  i) in response to an absence of the information packets transmitted over the channel, obtain a plurality of sets of signal samples sampled over the channel in the absence of the information packets, estimate noise power levels associated with the sets of signal samples, and allot the estimated noise power levels to respective noise power classes, each power class representing a respective designated power level range of the communication channel during the absence of the information packets, and
  ii) in response to a presence of at least one information packet transmitted over the channel, estimate an information packet power level associated with the at least one information packet;

compute a set of signal-to-noise ratios of the information packet power level to the noise power levels in the respective noise power classes;

compare the signal-to-noise ratios in the set of signal-to-noise ratios against a signal-to-noise threshold, wherein the signal-to-noise ratios in the set of signal-to-noise ratios are partitioned into a first subset of signal-to-noise ratios failing to exceed the signal-to-noise threshold and a second subset of signal-to-noise ratios exceeding the signal-to-noise threshold; and compute at least one resulting impulsive noise parameter as a function of impulsive noise parameters indicative of noise power levels included in the signal-to-noise ratios in the first subset of signal-to-noise ratios while disregarding impulsive noise parameters indicative of noise power levels included in the signal-to-noise ratios in the second subset of signal-to-noise ratios.

7. The communication interface of claim 6, wherein the communication interface is configured to be coupled to a power line communication channel in a power distribution grid.

8. The communication interface of claim 6, wherein the at least one resulting impulsive noise parameter comprises a final impulsive noise rate computed as a function of respective occurrence rates indicative of a number of times over a unit of time a noise power is allotted to a respective noise power class in the respective noise power classes.

9. The communication interface of claim 8, wherein the signal processing circuitry is configured to cause the communication interface to compute the respective occurrence rates as a function of a counter relative to a certain noise power class in the respective noise power classes, the counter being incremented every time a noise power is allotted to the certain noise power class.

10. The communication interface of claim 8, wherein the signal processing circuitry is configured to cause the communication interface to:
select, out of the noise power levels, a lowest non-null power level indicative of background noise affecting the communication channel; and
disregard the signal-to-noise ratio computed for the lowest non-null power level indicative of background noise in computing the final impulsive noise rate.

11. The communication interface of claim 8, wherein the signal processing circuitry is configured to cause the communication interface to:
select, out of the noise power levels, a lowest non-null power level indicative of background noise affecting the communication channel; and
compute a global signal-to-noise ratio for the communication channel as a function of both the final impulsive noise rate and the signal-to-noise ratio computed for the lowest non-null power level indicative of background noise.

12. A computer program product loadable in memory of at least one computer and including software code portions that, when run on the at least one computer, cause the at least one computer to:
check a communication channel for a presence of information packets, and
i) in response to an absence of the information packets transmitted over the channel, obtain a plurality of sets of signal samples sampled over the channel in the absence of the information packets, estimate noise power levels associated with the sets of signal samples, and allot the estimated noise power levels to respective noise power classes, each power class representing a respective designated power level range of the communication channel during the absence of the information packets, and
ii) in response to a presence of at least one information packet transmitted over the channel, estimate an information packet power level associated with the at least one information packet;
compute a set of signal-to-noise ratios of the information packet power level to the noise power levels in the respective noise power classes;
compare the signal-to-noise ratios in the set of signal-to-noise ratios against a signal-to-noise threshold, wherein the signal-to-noise ratios in the set of signal-to-noise ratios are partitioned into a first subset of signal-to-noise ratios failing to exceed the signal-to-noise threshold and a second subset of signal-to-noise ratios exceeding the signal-to-noise threshold; and
compute at least one resulting impulsive noise parameter as a function of impulsive noise parameters indicative of noise power levels included in the signal-to-noise ratios in the first subset of signal-to-noise ratios while disregarding impulsive noise parameters indicative of noise power levels included in the signal-to-noise ratios in the second subset of signal-to-noise ratios.

13. The computer program product of claim 12, wherein the at least one computer is configured to be coupled to a power line communication channel in a power distribution grid.

14. The computer program product of claim 12, wherein the at least one resulting impulsive noise parameter comprises a final impulsive noise rate computed as a function of respective occurrence rates indicative of a number of times over a unit of time a noise power is allotted to a respective noise power class in the respective noise power classes.

15. The computer program product of claim 14, wherein the software code portions, when run on the at least one computer, cause the at least one computer to compute the respective occurrence rates as a function of a counter relative to a certain noise power class in the respective noise power classes, the counter being incremented every time a noise power is allotted to the certain noise power class.

16. The computer program product of claim 14, wherein the software code portions, when run on the at least one computer, cause the at least one computer to:
select, out of the noise power levels, a lowest non-null power level indicative of background noise affecting the communication channel; and
disregard the signal-to-noise ratio computed for the lowest non-null power level indicative of background noise in computing the final impulsive noise rate.

17. The computer program product of claim 14, wherein the software code portions, when run on the at least one computer, cause the at least one computer to:
select, out of the noise power levels, a lowest non-null power level indicative of background noise affecting the communication channel; and
compute a global signal-to-noise ratio for the communication channel as a function of both the final impulsive noise rate and the signal-to-noise ratio computed for the lowest non-null power level indicative of background noise.

* * * * *